United States Patent Office 3,511,876
Patented May 12, 1970

3,511,876
N,N'-DIACYL-N,N'-BIS(HALOETHYL)OXAMIDES
Donald A. Tomalia, Midland, Mich., assignor to The Dow Chemical Company, Midland, Mich., a corporation of Delaware
No Drawing. Filed May 16, 1967, Ser. No. 638,741
Int. Cl. C07c 69/00
U.S. Cl. 260—482          5 Claims

ABSTRACT OF THE DISCLOSURE

N,N'-bis(2-haloethyl) - N,N' - (disubstituted)-oxamides corresponding to the formula

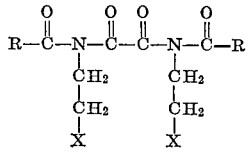

wherein R represents phenyl, phenoxy or lower alkoxy containing from 1 to 4 carbon atoms and X represents chlorine or bromine. The compounds possess pesticidal activity. Methods for their preparation which comprise reacting a 2-substituted-2-oxazoline and oxalyl chloride or oxalyl bromide or alternatively reactin 2,2'-dioxazoline with benzoyl chloride, phenyl haloformate or alkyl haloformate.

---

The present invention is directed to new substituted oxamides and to methods for their preparation and is particularly directed to new N,N'-bis(2-haloethyl)-N,N'-(disubstituted)-oxamides corresponding to the formula

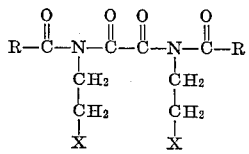

In the formulas set forth in the present specification and claims, R represents phenyl, phenoxy or lower alkoxy containing from 1 to 4 carbon atoms, inclusive, and X represents halo. The term "halo" as employed herein represents chlorine and bromine. The new compounds of the present invention are generally insoluble in water and of varying degrees of solubility in organic solvents. These compounds are useful as pesticides for the control of plant, fungal, insect and helminth organisms such as pinworms, plum curculio, pigweeds and barnyard grass.

In one novel method of the present invention the new oxamide compounds are prepared by reacting a substituted 2-oxazoline compound corresponding to formula

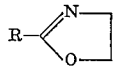

with an oxalyl halide such as oxalyl chloride or oxalyl bromide. The reaction is carried out in an inert hydrocarbon or halohydrocarbon solvent as reaction medium. The hydrocarbon or halohydrocarbon solvent to be employed as reaction medium should not react with either of the starting materials. Representative inert hydrocarbon and halohydrocarbon solvents include toluene, benzene, carbon tetrachloride, methylchloroform, chlorobenzene, chloroform, methylene chloride, dichlorobenzenes and the xylenes.

The reaction between the 2-substituted-2-oxazoline and the oxalyl halide is exothermic and proceeds readily at temperatures between 30° and 200° C. However, in a preferred embodiment of the present method the reaction is carried out at temperatures between 80° and 120° C. and generally under atmospheric pressure. However, when it is desired to carry out the method at a temperature which exceeds the boiling temperature of the reaction mixture it is necessary to place the reaction mixture under supraatmospheric pressure.

The exothermic reaction proceeds rapidly even at temperatures at the lower end of the reaction temperature range, and the reaction is generally complete within from 15 minutes to 1 hour. However, the temperature of the reaction mixture can be maintained within the reaction temperature range for from several hours to several days without adversely affecting the yield of oxamide product, although, the use of such extended periods of time is generally deemed to be uneconomical.

The reaction consumes the substituted-2-oxazoline and oxalyl halide starting materials in molar proportions of 2 to 1. The use of an excess of oxazoline does not hinder the reaction; however, the use of oxazoline in an amount less than 2 to 1 with respect to the oxalyl halide results in a decreased yield. Therefore, in a preferred procedure the oxazoline is employed in a molar ratio of at least 2:1 with respect to the oxalyl halide.

In carrying out this method of the present invention, the reactants are intimately contacted in the inert hydrocarbon or halohydrocarbon solvent in any order or fashion. The temperature of the reaction mixture is maintained within the reaction temperature range and the mixture stirred for from 15 minutes to 1 hour or longer. When employing temperatures at the lower end of the reaction temperature range, it is desirable to allow the reaction to progress for several hours. Following the reaction period, the reaction mixture is distilled to remove the low boiling constituents and obtain the product as a oily or solid residue. In some cases during the distillation of the low boiling constituents, the desired oxamide product precipitates in the reaction mixture as an oil or a solid and the oily or solid product can be separated by such conventional procedures as centrifugation or filtration. The oily or solid product obtained from the reaction mixture can then be further purified by washing, recrystallization or distillation.

In an alternative procedure, the new oxamide compounds are produced by a new method which comprises reacting 2,2'-bioxazoline with a benzoyl halide, phenyl haloformate, or alkyl haloformate in the presence of an anhydrous inert hydrocarbon or halohydrocarbon solvent at a temperature of from 75° to 200° C.

It is essential to the present invention that the hydrocarbon or halohydrocarbon solvent to be employed as the reaction medium be inert with respect to the starting materials. Furthermore, it is essential that the solvent employed as reaction medium contains no water. The presence of water in the reaction mixture will produce undesirable side reactions with an attendance decrease in the yield of the desired product. Representative inert hydrocarbon and halohydrocarbon solvents include toluene, carbon tetrachloride, methylchloroform, chlorobenzene, methylene chloride, o-dichlorobenzene, m-dichlorobenzene, p-dichlorobenzene and the xylenes. In a preferred embodiment, solvents having a boiling point of about 100° C. or greater such as toluene, o-dichlorobenzene, m-dichlorobenzene, p-dichlorobenzene, m-xylene, p-xylene and o-xylene are employed.

The reaction is exothermic and proceeds readily at temperatures between about 75° and 200° C. and preferably at between 100° and 200° C. Generally the reaction is carried out under atmospheric pressure; however, when employing temperatures in excess of the boiling temperature of the reaction mixture, the reaction is carried out under supraatmospheric pressures. While the exothermic reaction proceeds rapidly with the production of the desired oxamide product, generally the temperature of the reaction mixture is maintained within the reaction temperature range for from 1 to several hours. The maintenance of the reaction temperature within the reaction temperature range for longer periods of time does not adversely affect the yield of the desired oxamide product.

In carrying out the alternate method, the reactants are intimately contacted in any order or fashion in the anhydrous reaction medium. Good results are obtained when at least about two moles of the benzoyl chloride or of the appropriate haloformate are employed per mole of bioxazoline in the reaction. The temperature of the reaction mixture is maintained within the reaction temperature range for from about one to four hours or longer. Following the reaction period, the low boiling constituents of the reaction mixture are removed by evaporation or distillation to obtain the desired product as an oily or solid residue. This residue is then further purified by conventional procedures such as washing with an organic solvent or recrystallization.

The following examples are merely illustrative and are not to be construed as limiting.

EXAMPLE 1

2-ethoxy-2-oxazoline (4.60 grams; 0.04 mole) was dispersed in 10 milliliters of methylene chloride with stirring and the resulting mixture cooled in an ice bath. To this cooled solution was added slowly, dropwise, a solution of oxalyl chloride (2.54 grams; 0.02 mole) in 10 milliliters of methylene chloride. During the addition of the oxalyl chloride solution the reaction generated heat. However, the temperature of the reaction mixture was controlled by the ice bath and the rate of addition of the oxalyl chloride. Following the addition of the oxalyl chloride solution, the reaction mixture was concentrated by evaporation of the low boiling constituents to obtain the product as an oily residue. The N,N'-bis(2-chloroethyl)-N,N'-bis(ethoxycarbonyl)-oxamide product (also named as oxalybis(2-chloroethyl)-carbamic acid diethyl ester) was a light yellow, viscous oil. Infrared and nuclear magnetic resonance spectra of this product confirm the assigned structure.

EXAMPLE 2

2-phenyl-2-oxazoline (2.94 grams; 0.02 mole) was dispersed with stirring in 20 milliliters of dry toluene and oxalyl chloride (1.27 grams; 0.01 mole) in 5 milliliters of dry toluent added slowly dropwise to the stirred mixture over a period of 10 minutes. The heat generated by the exothermic reaction raised the temperature of the reaction mixture to 43° C. Following the addition of the oxalyl chloride, the stirring was continued for an additional 15 minutes. Thereafter the reaction mixture was placed on a steam bath and a stream of nitrogen passed over the surface of the reaction mixture to evaporate the low boiling constituents and obtain a thick oily residue. This thick oily residue was then cooled and induced to crystallize by scratching. The resulting crystalline product was slurried in n-hexane and filtered to remove the crystalline solid product. This N,N'-bis(2-chloroethyl)-N,N'-(dibenzoyl)-oxamide product was recrystallized from absolute methanol dried and found to melt at 116°–117° C.

EXAMPLE 3

2-phenyl-2-oxazoline (5.88 grams; 0.04 mole) was dispersed in 45 milliliters of orthodichlorobenzene. The mixture is then heated at the boiling temperature and under gentle reflux. Oxalyl bromide (4.32 grams; 0.02 mole) in 25 milliliters of orthodichlorobenzene is added slowly dropwise to the gently refluxing mixture. Following the addition of the oxalyl bromide, the reaction mixture is concentrated in vacuo to obtain as a residue the desired N,N'-bis(2-bromoethyl)-N,N'-(dibenzoyl)-oxamide product (molecular weight 510).

EXAMPLE 4

2-n-butoxy-2-oxazoline (2.86 grams; 0.02 mole) was dispersed in 30 milliliters of chloroform and the resulting solution heated at the boiling temperature and under reflux. To the refluxing solution was added slowly dropwise a solution of oxalyl bromide (2.16 grams; 0.01 mole) in 20 milliliters of chloroform over a period of 20 minutes. Upon completion of the addition of the oxalyl bromide, the reaction mixture is heated at the boiling temperautre for an additional 45 minutes. Following the heating period the reaction mixture is concentrated to obtain the N,N'-bis(2-bromoethyl)-N,N'-bis(n-butoxycarbonyl)-oxamide product (molecular weight 502).

EXAMPLE 5

Benzoyl chloride (2.8 grams; 0.02 mole) and 2,2'-bioxazoline (1.4 grams; 0.01 mole) were dispersed in 20 milliliters of dry toluene and the resulting dispersion heated at the boiling temperature and under reflux for two hours. Following the refluxing period, the reaction mixture was concentrated by evaporating off the low boiling constituents to obtain a viscous oil as a residue. This oil was mixed with 10 milliliters of diethyl ether and crystal formation induced by scratching the side of the container. The crystalline product which formed was separated by filtration product and washed with n-hexane. The washed crystalline product was then recrystallized from absolute methanol to obtain the N,N'-bis(2 - chloroethyl) - N,N' - (dibenzoyl)-oxamide melting at 114.5–115° C. The infrared and N.M.R. spectra for this product are identical to the spectra obtained for the product in Example 2.

EXAMPLE 6

Phenyl chloroformate and 2,2'-bioxazoline are dispersed in dry methylchloroform and the resulting reaction mixture heated at the boiling temperature for six hours. Following the heating period, the N,N'-bis(2-chloroethyl)-N,N' - bis(phenoxycarbonyl) - oxamide product (molecular weight 453) is isolated as described in Example 3.

EXAMPLE 7 n-Propyl chloroformate and 2,2'-bioxazoline are dispersed in dry ortho-xylene and the resulting reaction mixture heated at the boiling temperautre for two hours. Following the refluxing period, the N,N' - bis(chloroethyl) - N,N' - bis(n-propoxycarbonyl) - oxamide product (molecular weight 385) is isolated as described in Example 3.

The new compounds of the present invention are useful pesticides for the control of a number of insects, helminths and plants. For such uses the unmodified compound can be employed. The compound can also be dispersed on a finely divided solid and employed as a dust. Also, such mixtures can be dispersed in water with or without the aid of a surface-active dispersing agent and the resulting aqueous suspension employed as a spray, drench, or wash. In other procedures, the products are employed as the toxic constituents in solvent solutions, oil-in-water or water-in-oil emulsions or aqueous dispersions.

In representative operations, N,N'-bis(2-chloroethyl)-N,N' - (dibenzoyl)-oxamide was mixed with a balanced rodent feed as the sole active toxicant compound at a concentration of 600 parts per million by weight of the feed to prepare a feed composition. Pinworm-infested mice were fed said feed composition ad libitum for seven days then sacrificed and necropsied to ascertain the presence or absence of pinworms. Complete control of pinworms was obtained in the mice. In further operations, N,N' - bis(2 - chloroethyl) - N,N' - bis(ethoxycarbonyl)-oxamide gave substantially complete control of pigweeds, bindweed and barnyard grass when employed as a pre-emergent herbicide. In such operations, an aqueous composition containing N,N' - bis(2 - chloroethyl) - N,N'-bis(ethoxycarbonyl)-oxamide as the sole toxicant is applied to the soil in an amount sufficient to provide the toxicant at a rate of 10 pounds per acre. Immediately after the soil was treated, it was seeded with the seeds of the aforementioned plants and the area observed to determine the degree of control afforded by the toxicant.

I claim:

1. An N,N' - bis(2 - haloethyl) - N,N'-(disubstituted)-oxamide corresponding to the formula

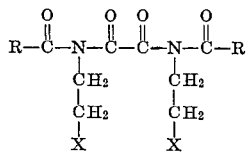

wherein R represents phenyl, phenoxy or lower alkoxy containing from 1 to 4 carbon atoms, inclusive, and X represents chlorine or bromine.

2. The compound claimed in claim 1 wherein the N,N' - bis(2 - haloethyl) - N,N' - (disubstituted)-oxamide is N,N' - bis(2 - chloroethyl)-N,N'-(dibenzoyl)-oxamide.

3. The compound claimed in claim 1 wherein the N,N' - bis(2 - haloethyl)-N,N'-(disubstituted)-oxamide is N,N' - bis(2 - chloroethyl) - N,N' - bis(ethoxycarbonyl)-oxamide.

4. The method of preparing a compound of the formula reacting an oxalyl halide with a 2-substituted-2-oxazoline compound corresponding to the formula

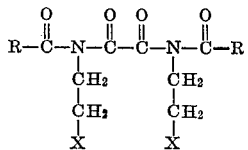

where R represents phenyl, phenoxy or lower alkoxy of from 1 to 4 carbon atoms, inclusive, in an anhydrous inert hydrocarbon or halohydrocarbon solvent at a temperature of from 30° to 200° C.

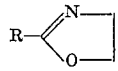

5. The method of preparing a compound of the formula

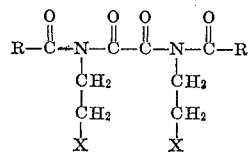

wherein X is a halogen and R is selected from the group consisting of phenyl, phenoxy or lower alkoxy of from 1 to 4 carbon atoms, the method comprising reacting a member of the group consisting of benzoyl halide, phenyl haloformates and alkyl haloformates in which alkyl is of from 1 to 4 carbon atoms, inclusive, with 2,2'-bioxazoline in an anhydrous inert hydrocarbon or halohydrocarbon solvent at a temperature of from 75° to 200° C.

References Cited

UNITED STATES PATENTS 3,096,373   1963   Kirchner _____ 260—558

HENRY R. JILES, Primary Examiner

H. I. MOATZ, Assistant Examiner

U.S. Cl. X.R.

260—479, 558; 424—313, 324

UNITED STATES PATENT OFFICE
CERTIFICATE OF CORRECTION

Patent No 3,511,876  May 12, 1970

Donald A. Tomalia

It is certified that error appears in the above identified patent and that said Letters Patent are hereby corrected as shown below:

Columns 5 and 6, claim 4 should appear as shown below:

4. The method of preparing a compound of the formula

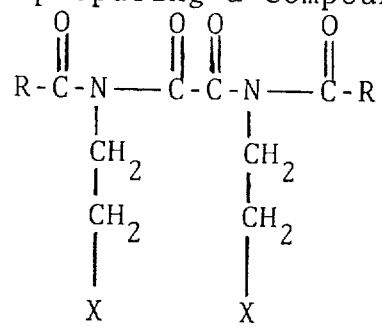

wherein X is halogen and R is defined below, the method comprising reacting an oxalyl halide with a 2-substituted-2-oxazoline compound corresponding to the formula

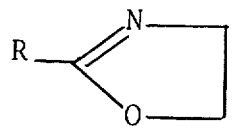

wherein R represents phenyl, phenoxy or lower alkoxy of from 1 to 4 carbon atoms, inclusive, in a anhydrous inert hydrocarbon or halohydrocarbon solvent at a temperature of from 30° to 200° C.

Signed and sealed this 13th day of October 1970.

(SEAL)
Attest:

EDWARD M. FLETCHER, JR.
Attesting Officer

WILLIAM E. SCHUYLER, JR.
Commissioner of Patents